US009183507B1

(12) United States Patent
Lin et al.

(10) Patent No.: US 9,183,507 B1
(45) Date of Patent: Nov. 10, 2015

(54) CONTEXT BASED INFERENCE OF SAVE LOCATION

(71) Applicant: Microsoft Technology Licensing, LLC, Redmond, WA (US)

(72) Inventors: Eugene Lin, Seattle, WA (US); Jonathan Keslin, Kirkland, WA (US); Neal Myerson, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/543,886

(22) Filed: Nov. 17, 2014

(51) Int. Cl.
  *G06N 5/04* (2006.01)
  *G06F 17/30* (2006.01)

(52) U.S. Cl.
  CPC .......... *G06N 5/048* (2013.01); *G06F 17/30091* (2013.01)

(58) Field of Classification Search
  CPC ............... G06F 17/30699–17/30702; G06F 17/30705–17/30713; G06F 17/30731–17/30737
  See application file for complete search history.

(56) References Cited

U.S. PATENT DOCUMENTS

| | | | |
|---|---|---|---|
| 5,918,236 A * | 6/1999 | Wical ............................ | 715/209 |
| 6,592,627 B1 * | 7/2003 | Agrawal et al. ............... | 715/234 |
| 6,675,159 B1 * | 1/2004 | Lin et al. ...................... | 1/1 |
| 8,601,598 B2 | 12/2013 | Ozzie et al. | |
| 2004/0117367 A1 * | 6/2004 | Smith et al. ................. | 707/5 |
| 2006/0028252 A1 * | 2/2006 | McCauley et al. ........... | 327/120 |
| 2008/0168340 A1 | 7/2008 | Jang | |
| 2010/0094822 A1 | 4/2010 | Kelapure | |
| 2012/0023145 A1 | 1/2012 | Brannon et al. | |
| 2013/0297535 A1 | 11/2013 | Joshi et al. | |
| 2014/0006350 A1 | 1/2014 | Fukui et al. | |
| 2014/0007215 A1 | 1/2014 | Romano et al. | |

OTHER PUBLICATIONS

Hess, Christopher K. et al.; "An application of a context-aware file system"; 2003; Pers Ubiquit Comput (2003) 7; pp. 339-352.*

(Continued)

*Primary Examiner* — Stanley K Hill
(74) *Attorney, Agent, or Firm* — Tom Wong; Jim Ross; Micky Minhas

(57) ABSTRACT

A user may store content in a data store that includes multiple repositories corresponding to one or more categories, where each of the repositories may include one or more containers for content storage. An inference application may be configured to automatically save the content to a location within the one or more containers of the repository. For example, the inference application may be configured to detect content to be saved for a user. The inference application may analyze one or more attributes of the user and the content to infer a repository category to which the content is related, and determine a confidence level associated with the inferred repository category. In response to a determination that the confidence level is above a threshold, the content may be automatically saved to a determined location within one or more containers of a repository corresponding to the inferred repository category.

19 Claims, 10 Drawing Sheets

(56) References Cited

OTHER PUBLICATIONS

Khungar, Sharat et al.; "A Context Based Storage System for Mobile Computing Applications"; 2005; ACM; Mobile Computing and Communications Review vol. 9, No. 1; pp. 64-68.*

"Flexible Containerization for Your Mobile Deployment", Published on: Jul. 2, 2013 Available at: http://www.air-watch.com/solutions/containerization.

Souppaya, et al., "Guidelines for Managing the Security of Mobile Devices in the Enterprise", In International Conference on Frontiers of Characterization and Metrology for Nanoelectronics, Mar. 25, 2013, 30 pages.

"Introduction to the Records Center site", Retrieved on: Sep. 26, 2014 Available at: http://office.microsoft.com/en-in/sharepoint-server-help/introduction-to-the-records-center-site-HA010173596.aspx.

"Backload", Retrieved on: Sep. 26, 2014 Available at: https://github.com/blackcity/Backload.

Davis, et al., "From Context to Content: Leveraging Context to Infer Media Metadata", In Proceedings of the 12th annual ACM international conference on Multimedia, Oct. 10, 2004, 8 pages.

* cited by examiner

CONTEXT BASED INFERENCE OF SAVE LOCATION

BACKGROUND

Users may store content, such as documents, photos, or other files, in cloud services. The cloud services may have two or more repositories of data, such as a personal repository for storing personal content, and a workplace-controlled repository for storing work-related content, among other examples. Each of these repositories may include one or more containers for content storage. Users may find saving content to a repository inconvenient as navigating and/or searching for an appropriate container to save the content within may be difficult and slow, especially since many users share a device between their personal lives and work lives. For example, a user may use a camera application of a smart phone to take photos of their family on vacation and photos of a whiteboard at work. Furthermore, users may find that saving content to a repository reduces their productivity, as the users may have to stop working and think about where to save the content.

Existing solutions for saving content may prompt users to explicitly choose a repository to store the content, or may default to a single repository and have the user explicitly switch to another repository when applicable.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to detecting content to be saved for a user, analyzing one or more attributes of the user and the content to infer a repository category to which the content is related, determining a confidence level associated with the inferred repository category, and automatically saving the content to a repository corresponding to the inferred repository category in response to a determination that the confidence level is above a first threshold.

These and other features and advantages will be apparent from a reading of the following detailed description and a review of the associated drawings. It is to be understood that both the foregoing general description and the following detailed description are explanatory and do not restrict aspects as claimed.

GLOSSARY

Figure 1:
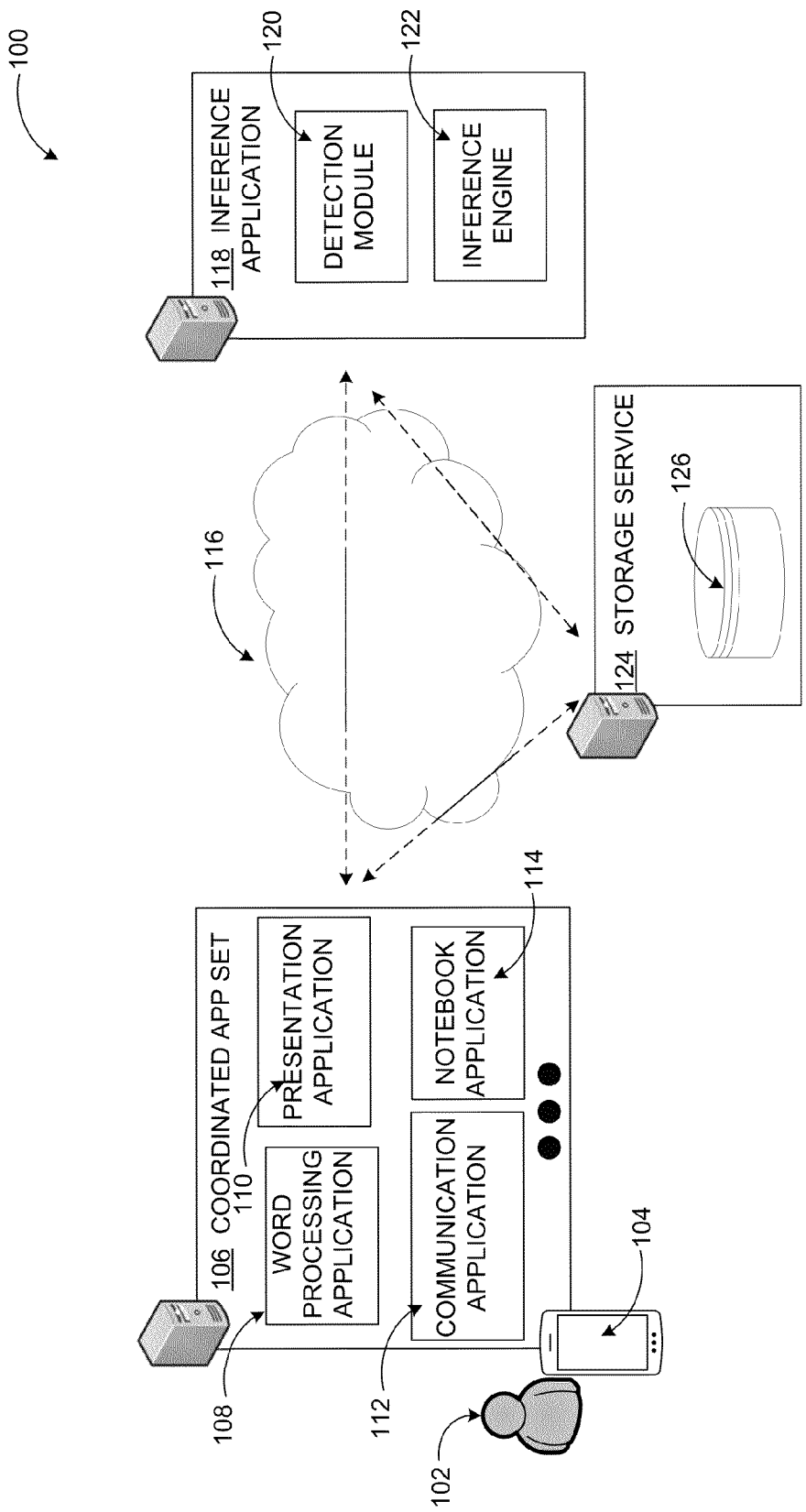
FIG. 1 includes an example network environment where an inference application may be a third-party service.

Content—any form of structured data and streaming data that is associated with audio, video, graphics, images, and text.

User—a person with whom the content to be saved is associated.

User attributes—one or more context elements associated with a user that are analyzed to infer a repository category for saving the content.

Content attributes—one or more context elements associated with the content that are analyzed to infer a repository category for saving the content.

Repository—a component of a data store comprising one or more containers for content storage.

Repository category—a general description that characterizes content stored within a repository.

Confidence level—a percentage of confidence that the inferred repository category is accurate based on a ratio of context elements that correspond to the inferred repository category.

First threshold—a predefined percentage of confidence or a minimum number of total context elements that positively match the inferred repository category that determines whether the content is automatically saved to a repository corresponding to the inferred repository category.

Second threshold—a predefined percentage of confidence or a minimum number of total context elements that positively match the inferred repository category that determines whether a default repository and an option to override the default repository is presented to a user, or whether a list of repositories is presented to the user for selection of a repository.

Default repository—a repository presented to a user along with an option to override the default repository in response to a determination that the confidence level is below a first threshold and above a second threshold.

Explicit user selection—a direct selection of a repository by a user.

Context—one or more elements determined from the content that are used to infer a repository category, including a type of the content, phrases within the content, a source of the content, a communication mode between a sender of the content and a user, an email address of one or both of the sender and the user, a reference to intranet sites, geotags, one or more repositories selected for other similar content, and a reference to other users.

Communication mode—a communication method or channel through which a user (sender) communicates with one or more other users that includes voice communication, audio communication, video communication, email messaging, text messaging, instant messaging, application sharing, or data sharing through wired and/or wireless means.

Reference to intranet site—a reference to a website that is internally associated with an entity such as a company or similar organization.

Geotag—a reference to a location within content.

Reference to user—a mention of a name or an image associated with a user within content.

Tagged content—content that has been associated with an inferred repository category and the association is indicated by metadata of the content.

Container—a component of a repository that stores content.

Heuristics—a level analysis algorithm employed to infer a repository and/or a container within a repository to store content based on explicit tags, raw content analysis, content type, content structure, and similarities with other content.

Learning—an experience based technique employed to infer a repository and/or a container within a repository to store content that analyzes user behavior and uses locations determined for similar content in the past to inform a location to store current content.

Direct user configuration—user selection of a repository and/or a container within a repository to store content.

Secure container—a component of a repository that includes one or more permission settings.

Permission level—a security setting that enables a user to control access to the content within a container or repository.

Computing device—a device comprising at least a memory and a processor that includes a desktop computer, a laptop computer, a tablet computer, a smart phone, a vehicle mount computer, or a wearable computer.

Memory—a component of a computing device configured to store one or more instructions to be executed by one or more processors.

A processor—a component of a computing device coupled to a memory and configured to execute an inference application in conjunction with instructions stored by the memory.

Inference application—an application configured to employ context-based inference to automatically save the content to a location within one or more containers of a repository that comprises a detection module and an inference engine, and is one of a third party service or an integrated module of a coordinated application set, an operating system, or an application.

Detection module—a module of an inference application.

Direct save action—an explicit user action indicating a desire by the user to save content.

Implicit save action—an automatic save action executed by an application through which content is being shared, viewed, edited, created, or communicated.

File—any form of structured data that is associated with audio, video, graphics, images, and text.

Inference engine—a module of an inference application to perform inference tasks.

File attributes—one or more context elements associated with a file that are used to infer a repository category.

Data store—one of a cloud data store or a component of a computing device that includes one or more repositories for content storage.

Work repository—a repository comprising work-related content.

Personal repository—a repository comprising personal content.

Third party service—an independent service separate from a system used by the initiating user and the target user, another service, or an application.

Operating system—a system configured to manage hardware and software components of a computing device that provides common services and applications.

Integrated module—a component of an application or service that is integrated within the application or service such that the application or service is configured to execute the component.

Coordinated application set—a service to which a user subscribes to access one or more applications that when executed enable a user to communicate, view, create, edit, analyze, and share content.

Application—a program that when executed enables a user to communicate, create, edit, and share content.

Computer-readable memory device—a computer-readable storage medium implemented via one or more of a volatile computer memory, a non-volatile memory, a hard drive, a flash drive, a floppy disk, or a compact disk, and comparable hardware media that includes instructions thereon to automatically save content to a location.

Explanations—one or more reasons for the selection of the repository, the presentation of the default repository, and the presentation of the list of repositories User experience—a visual display associated with an application or service through which a user interacts with the application or service.

User action—an interaction between a user and a user experience of an application or a user experience provided by a service that includes one of touch input, gesture input, voice command, eye tracking, gyroscopic input, pen input, mouse input, and keyboards input.

DETAILED DESCRIPTION

As briefly described above, a user may store content in a data store that includes multiple repositories corresponding to one or more categories, where each of the repositories may include one or more containers for content storage. An inference application may be configured to detect content to be saved for the user, where an implicit save action or a direct save action may be detected. The inference application may analyze one or more attributes of the user and the content to infer a repository category to which the content is related, where the repository category may include personal and work, for example, and a confidence level associated with the inferred repository category may be determined. In response to a determination that the confidence level is above a threshold, the content may the automatically saved to a determined location within the containers of a repository corresponding to the inferred repository category. Alternatively, a default repository with an option to override the default repository may be presented to the user, or a list of repositories may be presented to the user for explicit selection of a repository.

In the following detailed description, references are made to the accompanying drawings that form a part hereof, and in which are shown by way of illustrations, specific embodiments, or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While some embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Some embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable hardware media.

Throughout this specification, the term "platform" may be a combination of software and hardware components for employment of context-based inference to automatically save content to a location within one or more containers of a repository. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

FIG. 1 includes an example network environment where an inference application may be a third-party service. As shown in diagram 100, a user 102 may subscribe to a coordinated application set 106. The coordinated application set 106 may provide the user 102 access to one or more applications such as a communication application 112, a word-processing application 108, a spreadsheet application, a notebook application 114, or a presentation application 110 that upon execution may enable the user 102 to communicate, create, edit, and share content. The content may include any form of structured data and streaming data that is associated with audio, video, graphics, images, and text. For example, a user 102 may execute the word-processing application 108 on a computing device 104, such as a smart phone. Other computing devices may include a desktop computer, a laptop, a tablet, and a wearable, for example. Implicitly or explicitly saved content from the word-processing application 108 may be stored in a data store 126. In one example, the data store 126 may be provided by a storage service 124 over a network, such as a cloud 116, as illustrated. In other examples, the data store 126 may be a part of the computing device 104. The data store 126 may include one or more repositories, where each repository may include one or more containers for content storage. An inference application 118 comprising a detection module 120 and an inference engine 122 may be a third party service configured to automatically save the content to a location within the data store 126.

In an example embodiment, the user 102 may directly save content through the word-processing application 108 executed on the computing device 104. The detection module 120 of the inference application 118 may be configured to detect the direct save action of the user 102. In other examples, the word-processing application 108 may automatically save the content at predefined time intervals, for example. The detection module 120 may be further configured to detect the implicit save action of the word-processing application 108.

The inference engine 122 of the inference application 118 may be configured to analyze one or more attributes of the user and the content to infer a repository category to which the content is related. The content may then be tagged with the inferred repository category. A repository category may be a general description that characterizes content stored within a repository. For example, a repository category may be work or personal. However, there may be any number of work categories each corresponding to a specific project or client, for example, and any number of personal categories, including finances, family, and friends. Analyzing the attributes may include determining a context of the content. One or more elements of the determined context may include a type of the content, phrases within the content, a source of the content, a communication mode between a sender of the content and the user 102, an email address of one or both of the sender and the user 102, a reference to intranet sites, geotags, one or more repositories selected for other similar content, and a reference to other users.

For example, the content may be a document created by the user 102 that includes confidential material associated with a new product to be released by a company the user 102 works for. Upon analyzing the attributes, the type of file may be determined to be a word-processing document. A source may be determined as the user 102. An intranet site referenced in the document may correspond to an intranet site internally associated with the company, and a reference to other users within the document may correspond to one or more co-workers. Accordingly, work may be the inferred repository category.

In some embodiments, the inference engine 122 may determine a confidence level associated with the inferred repository category, where the confidence level may be a percentage of confidence that the inferred repository category is accurate based on a ratio of context elements that correspond to the inferred repository category. For example, if the inferred repository category is work, and 8 out of 10 determined context elements are associated with work, a confidence level of 80% may be determined.

In some examples, there may be a first threshold and a second threshold of the confidence level. For example, a first threshold may be 75% confidence in the inferred repository category, and a second threshold may be 50% confidence in the inferred repository category. In other examples, a minimum number of total context elements may define the first threshold and second threshold. For example, the first threshold may be at least 5 positive matches of the context elements to the inferred repository category, and the second threshold may be at be at least 3 positive matches of the context elements to the inferred repository category.

In response to a determination that the confidence level is above the first threshold, the content may be automatically saved to a repository of the data store 126 that corresponds to the inferred repository category. Accordingly, in the example scenario above, the 80% confidence level is above the first threshold (75% confidence level) and thus, the content may be automatically saved to a work repository within the data store 126. In response to a determination that the confidence level is below the first threshold and above the second threshold, a default repository may be presented to the user 102 along with an option to change the default repository through a display of the computing device 104. The display may include a user experience associated with the word-processing application 108 or a separate user experience, such as a user experience provided by the inference application 118. In response to a determination that the confidence level is below the second threshold, a list of repositories may be presented to the user 102 for explicit selection of the repository through the user experience associated with the word-processing application 108 or the separate user experience. In some examples, the list of repositories may be prioritized based on the determined context elements and/or the determined confidence level associated with each of the repositories in the list. For example, if three context elements corresponded to work and one context element corresponded to personal, a work repository may precede a personal repository within the list. In other examples, one or more explanations for the selection of the repository, the presentation of the default repository, or the presentation of the list of repositories may be provided to the user through the user experience associated with the word-processing application 108 or the separate user experience. For example, the explanations may include the determined confidence level for each repository and/or the determined context elements associated with each repository.

The inference engine 122 may further be configured to determine a location within one or more containers of the repository to automatically save the content. The location may be determined using one or more of configurable rules, heuristics, machine learning, and/or a direct configuration by the user. For example, the location may be determined using heuristics by employing a level analysis algorithm based on explicit tags, raw content analysis, content type, content structure, and similarities with other content. In an example scenario, content determined to be a word processing document (content type) that includes a project name (raw content analysis) may be stored in the project documents container of a work repository. Furthermore, if the content is determined to be a report (content structure), the content may be stored within a report container within the project documents container of the work repository. Additionally, if it is determined the content contains the phrase "Annual Report", and all previous word processing documents including the project name and containing the phrase "Annual Report" were put into an annual report container within the report container (similarities with other content), the content may be stored within the annual report container. In some embodiments, the configurable rules, heuristics, machine learning, and/or direct user configuration may also be employed in the initial analysis of the user and content attributes to infer the repository category based on the determined context.

In other examples, security measures may be implemented to ensure confidentiality of content stored. For example, content may be automatically saved to a secure container within the repository based on a determination that the content includes confidential material. The user 102 may also be enabled to set permission levels for content stored in one or more containers of the repository. For example, the user may set permission levels of a secure container comprising confidential content to read-only. Therefore, any other users accessing the content may not be able to edit, copy, and/or share the content.

In some embodiments, because the inference application 118 is a third party service, the inference engine 122 may be configured to collect data associated with automatic saves to repositories, and user overrides and/or selections of repositories from multiple users that subscribe to the service. For example, the collected data may include the context elements determined to infer the repository category, which may indicate why the content was automatically saved to and/or the user overrode or selected the repository. Furthermore, the inference engine 122 may be configured to analyze the collected data to inform future inferences. For example, if a company subscribes to the inference application 118, data associated with automatic saves to and user overrides and/or selections of repositories may be collected and analyzed for each employee of the company. The analysis may reveal that the majority of employees may select to save their content to a specific container of a repository if it contains a specific phrase. Thus, in future scenarios where the inference engine 122 identifies the specific phrase in the determined context elements of content associated with an employee of the company, the inference engine 122 may automatically save the content to the specific container of the repository.

Existing solutions for the saving of content to a location may prompt users to explicitly choose a repository to store the content, or may default to a single repository and have the user explicitly switch to another repository when applicable. However, these solutions may involve performance of an additional user selection step, and may be inconvenient to the user as navigating and/or searching for an appropriate container to save the content within the repository may be difficult and slow. Furthermore, these solutions may reduce user productivity, as the user may have to stop working and think about where to save the content. Employment of context-based inference to automatically save content to a location within one or more containers of a repository, as described in the embodiments above, may eliminate the additional user selection step and eliminate the inconvenience of user navigation and search for the appropriate container, increasing user productivity. Furthermore, the determination of the confidence level associated with the inferred repository category may enhance reliability, along with enablement of the user to set permission levels for each container.

Figure 2:
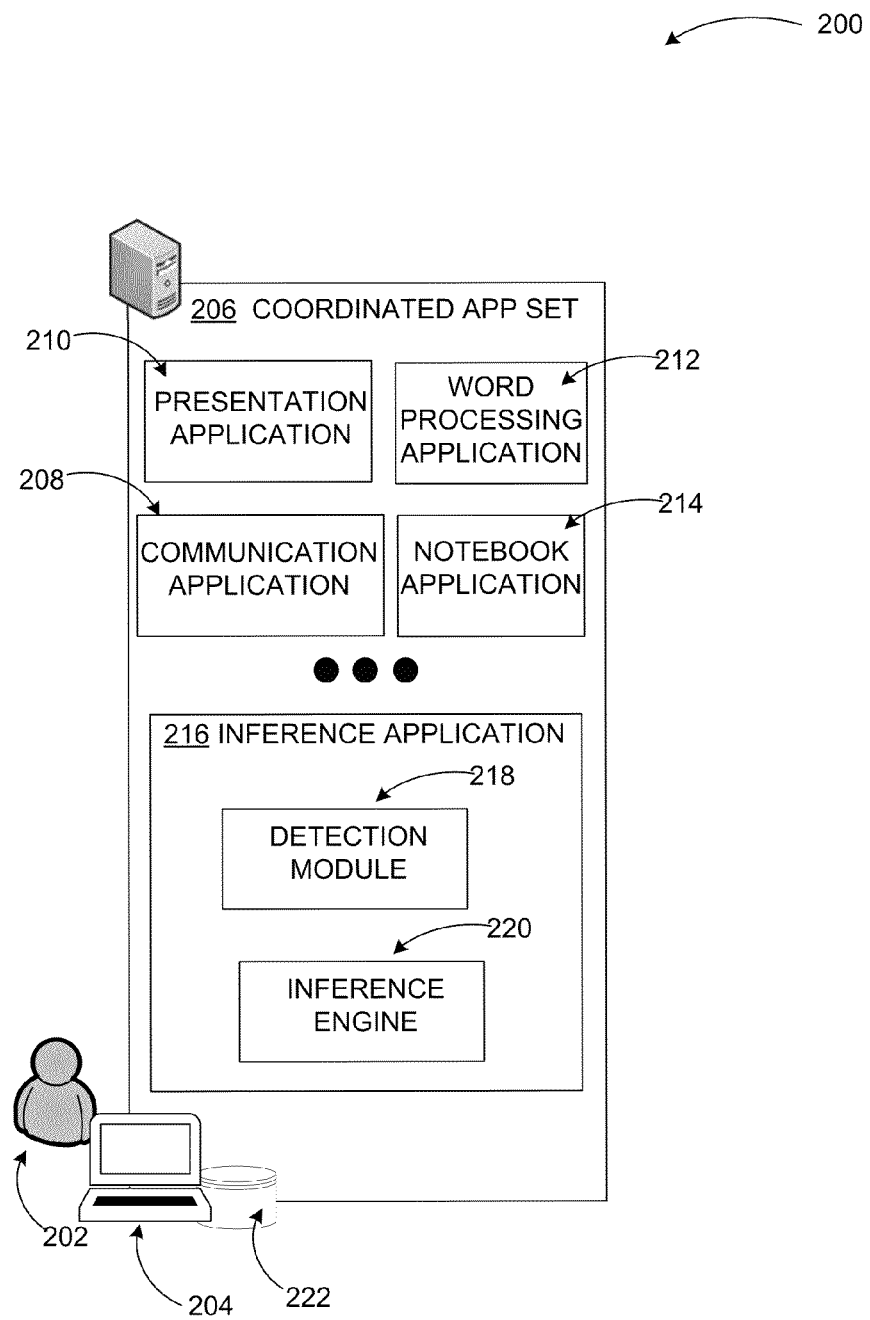
FIG. 2 illustrates an example network environment where an inference application may be an integrated module of a coordinated application set.

FIG. 2 illustrates an example network environment where an inference application may be an integrated module of a coordinated application set. As shown in diagram 200, a user 202 may subscribe to a coordinated application set 206. The coordinated application set 206 may provide the user 202 access to one or more applications, such as a communication application 208, a word-processing application 212, a spreadsheet application, a notebook application 214, or a presentation application 210 that upon execution may enable the user 202 to communicate, create, edit, and share content. For example, a user 202 may execute the communication application 208 on a computing device 204, such as a laptop. Other computing devices may include a desktop computer, a tablet, a smart phone, and a wearable, for example. Implicitly or explicitly saved content from the communication application 208 may be stored in a data store 222. In one example, the data store 222 may be a part of the computing device 204, as illustrated. In other examples, the data store 222 may be a cloud data store. The data store 222 may include one or more repositories, where each repository may include one or more containers for content storage. An inference application 216 comprising a detection module 218 and an inference engine 220 may be an integrated module of the coordinated application set 206, and may be configured to automatically save the content to a location within the data store 222. In other embodiments, the inference application 216 may be an integrated module of one of the applications of the coordinated application set 206 described above or of a web application, for example.

In an example embodiment, the user 202 may directly save a file through the communication application 208 executed on the computing device 204, where a file may be any form of structured data that is associated with audio, video, graphics, images, and text, for example. The detection module 218 of the inference application 216 may be configured to detect the direct save action of the user 202. In other examples, the communication application 208 may automatically save the file upon the user exiting out of the communication application 208, for example. The detection module 218 may be further configured to detect the implicit save action of the communication application 208.

The inference engine 220 of the inference application 216 may be configured to analyze one or more attributes of the user and the file to infer a repository category to which the file is related. Analyzing the attributes may include determining a context of the file. One or more elements of the determined context may include a type of the file, phrases within the file, a source of the file, a communication mode between a sender of the file and the user, an email address of one or both of the sender and the user, a reference to intranet sites, geotags, one or more repositories selected for other similar files, and a reference to other users. The file may then be tagged with the inferred repository category. In some examples, one or more of configurable rules, heuristics, machine learning, and a direct configuration by the user may also be employed in the analysis to infer the repository category based on the determined context.

For example, the file may be an email message received from a co-worker of the user 202. Upon analyzing the attributes, the type of file may be determined to be an email, and statistically improbable phrases common to the work place may be determined in the body of the email message, such as "Please see the attached document." A source may be determined as the co-worker, and the communication mode may be determined as email messaging, where the email addresses of both the co-worker and the user 202 may include a work domain. Accordingly, work may be the inferred repository category and the file may be tagged as work-related.

In some embodiments, the inference engine 220 may determine a confidence level associated with the inferred repository category, where the confidence level may be a percentage of confidence that the inferred repository category is accurate based on a ratio of context elements that correspond to the inferred repository category. In some examples, there may be a first threshold and a second threshold of the confidence level. In response to a determination that the confidence level is above the first threshold, the file may be automatically saved to a repository of the data store 222 that corresponds to the inferred repository category, such as a work repository. In response to a determination that the confidence level is below the first threshold and above the second threshold, a default repository may be presented to the user 202 along with an option to change the default repository. In response to a determination that the confidence level is below the second threshold, a list of repositories may be presented to the user 202 for explicit selection of the repository. The option to change the default repository or the list of repositories may be presented to the user 202 through a display of the computing device 204. The display may include a user experience associated with the communication application 208 or a separate user experience, such as a use experience provided by the inference application 216. In some examples, one or more explanations for the selection of the repository, the presentation of the default repository, or the presentation of the list of repositories may also be provided to the user.

The inference engine 220 may be further configured to determine a location within one or more containers of the repository to automatically save the content. The location may be determined using one or more of configurable rules, heuristics, machine learning, and a direct configuration by the user. For example, the location may be determined using machine learning, which may be an experience based technique that analyzes user behavior and uses locations determined for similar content in the past to inform a location to store current content. For example, if similar content has been saved to "Client A" container within the work repository multiple times in the past week by the user, the current content may be automatically saved to the "Client A" container within the work repository.

Figure 3:
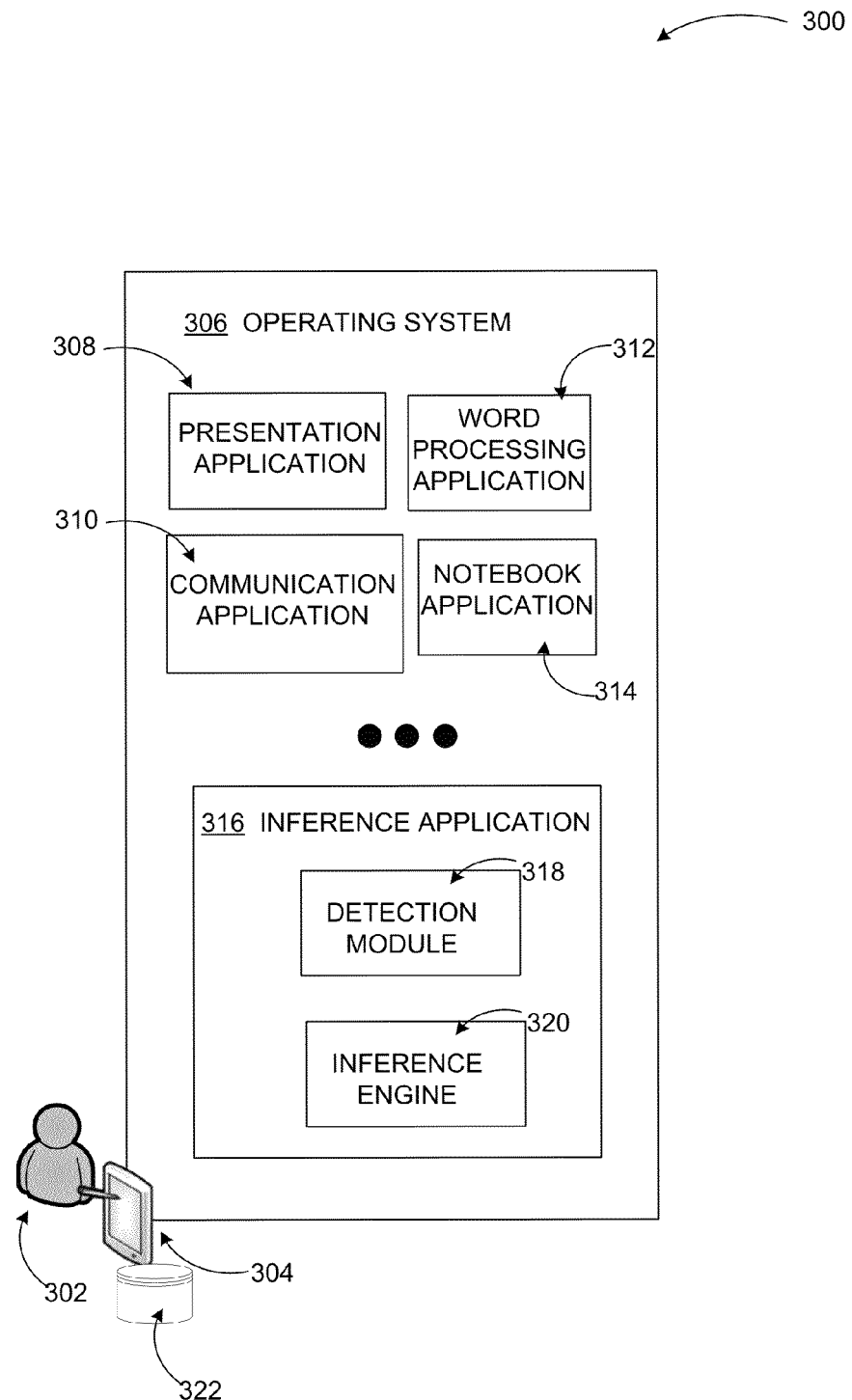
FIG. 3 illustrates an example network environment where an inference application may be an integrated module of an operating system.

FIG. 3 illustrates an example network environment where an inference application may be an integrated module of an operating system. An operating system may be configured to manage hardware and software components of a computing device, and provide common services and applications. As shown in diagram 300, an operating system 306 may provide a user 302 access to one or more applications such as a communication application 310, a word-processing application 312, a spreadsheet application, a notebook application 314, or a presentation application 308 that upon execution may enable the user 302 to communicate, create, edit, and share content. For example, a user 302 may execute the presentation application 308 on a computing device 304, such as a tablet. Other computing devices may include a desktop computer, a laptop, a smart phone, and a wearable, for example. Implicitly or explicitly saved content from the presentation application 308 may be stored in a data store 322. In one example, the data store 322 may be a part of the computing device 304, as illustrated. In other examples, the data store 322 may be a cloud data store. The data store 322 may include one or more repositories, where each repository may include one or more containers for content storage. An inference application 316 comprising a detection module 318 and an inference engine 320 may be an integrated module of the operating system 306, and may be configured to automatically save the content to a location within the data store 322.

In an example embodiment, the user 302 may directly save a file through the presentation application 308 executed on the computing device 304. The detection module 318 of the inference application 316 may be configured to detect the direct save action of the user 302. In other examples, the presentation application 308 may automatically save the file in response to an edit being made to the file, for example. The detection module 318 may be further configured to detect the implicit save action of the presentation application 308.

The inference engine 320 of the inference application 316 may be configured to analyze one or more attributes of the user and the file to infer a repository category to which the file is related. Analyzing the attributes may include determining a context of the file. One or more elements of the determined context may include a type of the file, phrases within the file, a source of the file, a communication mode between a sender of the file and the user 302, an email address of one or both of the sender and the user 302, a reference to intranet sites, geotags, one or more repositories selected for other similar files, and a reference to other users. In some examples, the file may then be tagged with the inferred repository category.

For example, the file may be a slideshow presentation including photos from a vacation created by the user 302. Upon analyzing the attributes, the type of file may be determined to be a presentation document. A geotag associated with one or more of the photos may correspond to a location not associated with work, and a reference to other users within the photos may correspond to one or more family members or friends that are not work-related. Accordingly, personal may be the inferred repository category and the file may be tagged as personal.

In some embodiments, the inference engine 320 may be configured to determine a confidence level associated with the inferred repository category, where the confidence level may be a percentage of confidence that the inferred repository category is accurate based on a ratio of context elements that correspond to the inferred repository category. In some embodiments, the inference engine 320 may weight each context element corresponding to the inferred repository category employing a point system to determine the ratio. For example, a geotag corresponding to the inferred repository category may only be worth 0.5 confidence "points", whereas a file type may be worth 1 confidence "point", and the sender of a file may be worth 1.5 confidence "points", for example.

In some examples, there may be a first threshold and a second threshold of the confidence level. In response to a determination that the confidence level is above the first threshold, the file may be automatically saved to a repository of the data store 322 that corresponds to the inferred repository category, such as a personal repository. In response to a determination that the confidence level is below the first threshold and above the second threshold, a default repository may be presented to the user 302 along with an option to change the default repository. In response to a determination that the confidence level is below the second threshold, a list of repositories may be presented to the user 302 for explicit selection of the repository. The option to change the default repository or the list of repositories may be presented to the user 302 through a display of the computing device 304. The display may include a user experience associated with the presentation application 308 or a separate user experience, such as a user experience provided by the inference application 316. In some examples, one or more explanations for the selection of the repository, the presentation of the default repository, or the presentation of the list of repositories may also be provided to the user.

The inference engine 320 may be further configured to determine a location within one or more containers of the repository to automatically save the content. The location may be determined using one or more of configurable rules, heuristics, machine learning, and a direct configuration by the user. For example, the location may be determined using rules, where a rule may state that if the content comprises a geotag that indicates any location other than a home or a work location, the file may be automatically saved to a vacation container within the personal repository.

Figure 4:
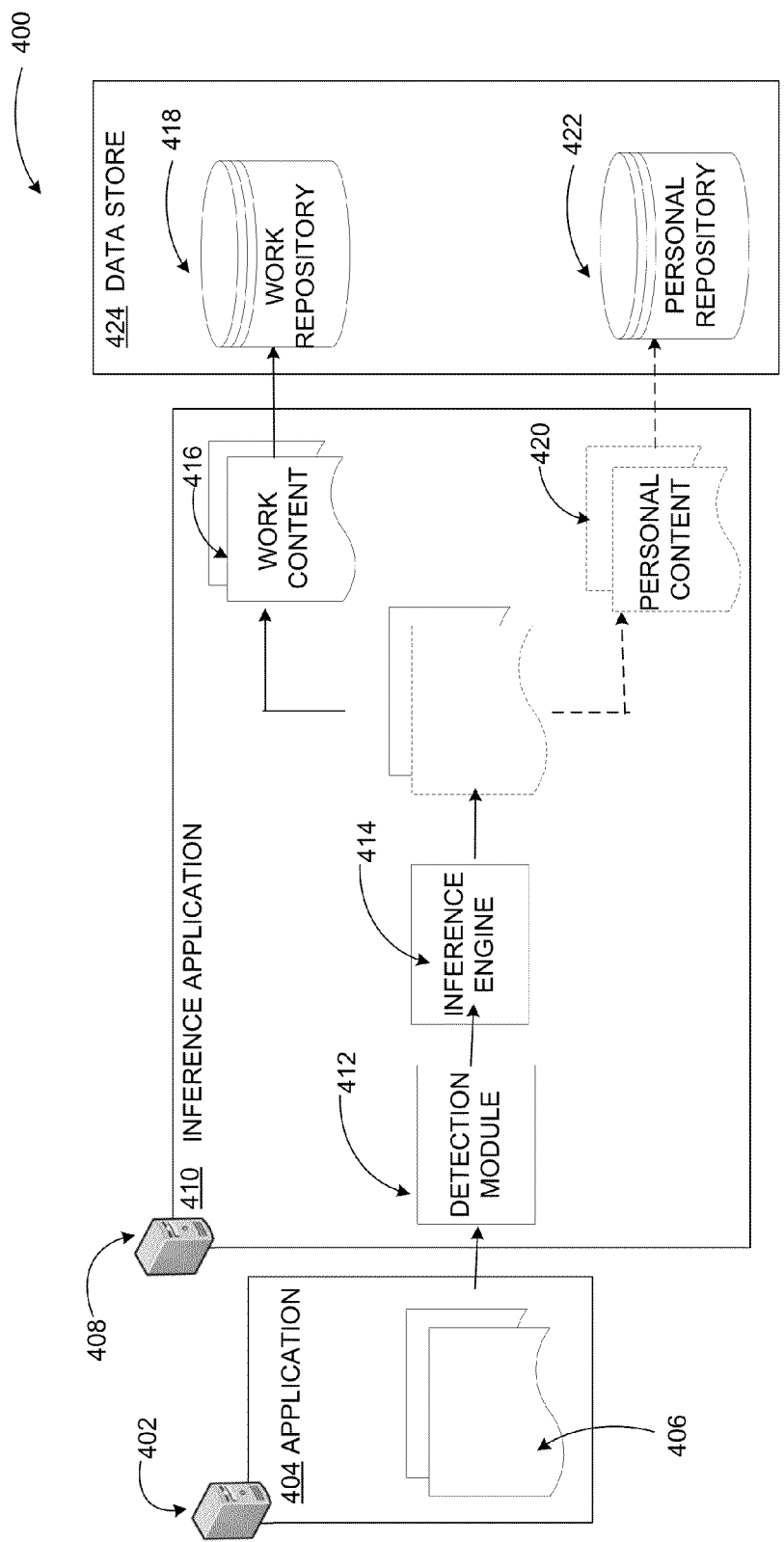
FIG. 4 illustrates an example system configured to automatically save content to a location.

FIG. 4 illustrates an example system configured to automatically save content to a location. As illustrated in diagram 400, a first server 402 may be configured to provide a user access to an application 404, where upon execution, the application 404 may enable a user to communicate, create, edit, and share content 406. The content 406 saved through the application 404 may be stored in a data store 424. The data store 424 may include one or more repositories, such as a work repository 418 and a personal repository 422, where each repository may include one or more containers for content storage. An inference application 410, executed by a second server 408 may include a detection module 412 and an inference engine 414, and may be configured to automatically save the content 406 to a location within the data store 424.

The detection module 412 may be configured to detect the content 406 to be saved. The inference engine 414 may be configured to analyze one or more attributes of the user and the content to infer a repository category to which the content 406 is related. Analyzing the attributes may include determining a context of the content 406. One or more elements of the determined context may include a type of the content, phrases within the content, a source of the content, a communication mode between a sender of the content and the user, an email address of one or both of the sender and the user, a reference to intranet sites, geotags, one or more repositories selected for other similar content, and a reference to other users. The content may then be tagged with the inferred repository category. For example, the content may be tagged as work-related 416 or the content may be tagged as personal 420.

In some embodiments, the inference engine 414 may be configured to determine a confidence level associated with the inferred repository category, where one or more thresholds may be defined. In response to a determination that the confidence level is above a threshold, the content may be automatically saved to a repository of the data store that corresponds to the inferred repository category. For example, the content tagged as work-related 416 may be automatically saved to the work repository 418 or the content tagged as personal 420 may be automatically saved to the personal repository 422. In further embodiments, the inference engine 414 may be further configured to determine a location to store the content within a container of a repository.

Figure 5:
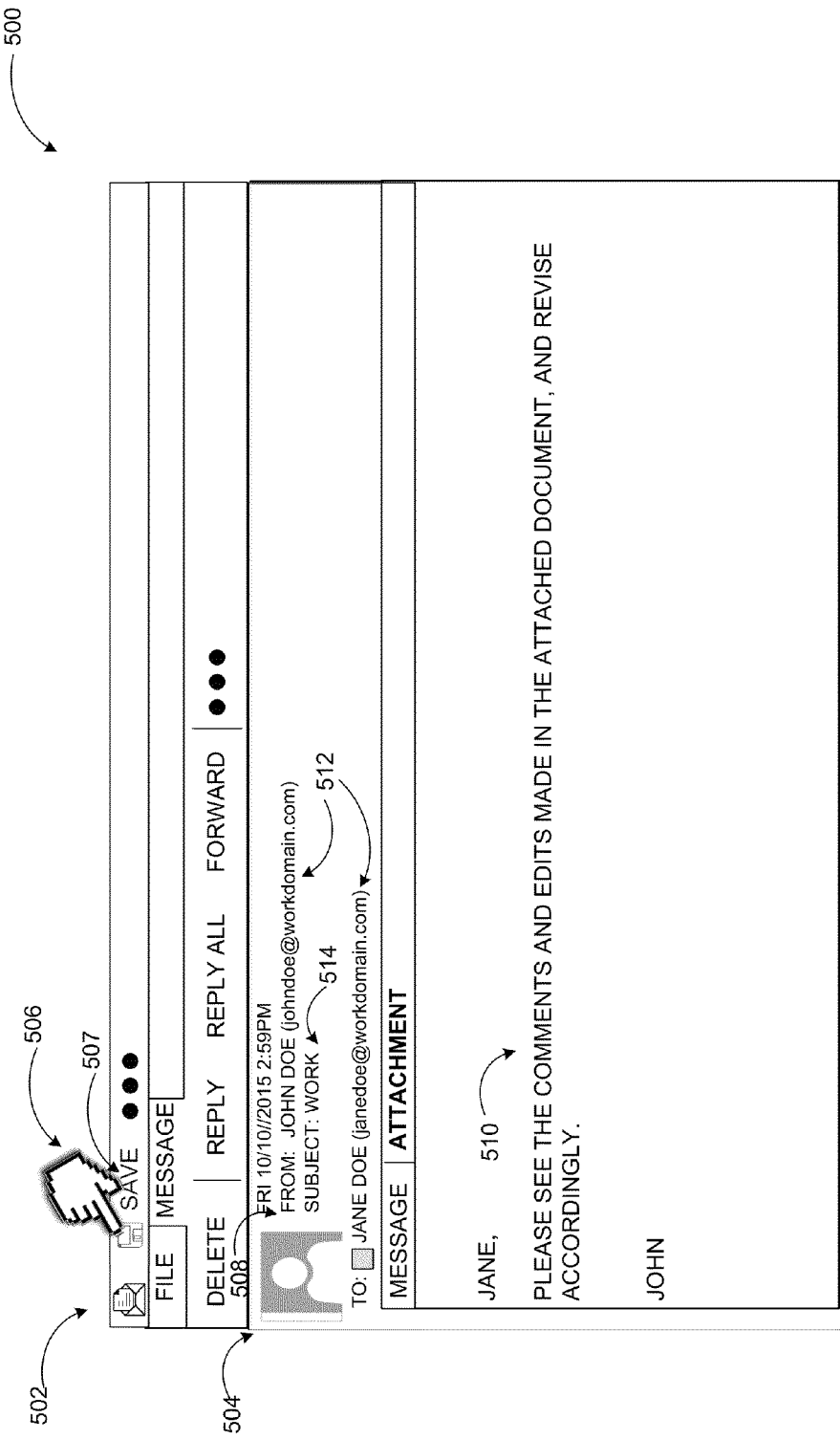
FIG. 5 illustrates an example scenario where content may be automatically saved to a repository.

FIG. 5 illustrates an example scenario where content may be automatically saved to a repository. As illustrated in diagram 500, a user may receive content 504, such as an email message, through a communication application 502. To save the content 504, the user may perform a direct save action 506 through one of touch input, as illustrated, gesture input, voice command, eye tracking, gyroscopic input, pen input, mouse input, and/or keyboard input. For example, the user may perform the direct save action 506 on a "Save" control element 507, which may be graphically and/or textually represented, on a user experience of the communication application 502. An inference application may be configured to employ context-based inference to automatically save the content 504 to a location within one or more containers of a repository. The inference application may be an integrated module of the communication application 502, for example, that includes a detection module and an inference engine.

The detection module may be configured to detect the content 504 to be saved. The inference engine of the inference application may be configured to analyze one or more attributes of the user and the content 504 to infer a repository category to which the content 504 is related. Analyzing the attributes may include determining a context of the content 504. One or more elements of the determined context may include a type of the content, phrases 510 within the content, a source 508 of the content, a communication mode between a sender of the content 504 and the user, and an email address 512 of one or both of the sender and the user.

The content 504 may then be tagged with the inferred repository category. For example, the content 504 may be tagged as work-related content because the content includes work-specific information 514 received from a source 508 with a work-specific email address 512 through one or more work-related communication modes, such as email messaging. Furthermore, the work-specific information 514 may include statistically improbably phrases 510 that are common in other workplace content and communications, such as "Please see the comments and edits . . . . "

The inference engine may be configured to determine a confidence level associated with the inferred repository category, work, based on a ratio of context elements that correspond to the inferred repository category, where one or more thresholds may be defined. For example, a 100% confidence level may be determined as 5 out of 5 determined context elements correspond to the inferred repository category of work. The inference engine may determine that the confidence level is above a threshold, and the content 504 may be automatically saved to a work repository. In some examples, the inference engine may be further configured to determine a location to store the content within a container of the work repository based on one or more rules. For example, one rule may define that all content to be saved associated with the source 508 be stored in a "Project B" container within the work repository. Accordingly, the content 504 may be automatically saved within the "Project B" container within the work repository. In other examples, the inference engine may be further configured to determine a location to store the content within a container of the work repository based on heuristics, machine learning, or direct user configuration. In some embodiments, the rules, heuristics, machine learning, and/or direct user configuration may also be employed in the initial analysis of user and content attributes to infer the repository category based on the determined context.

Figure 6:
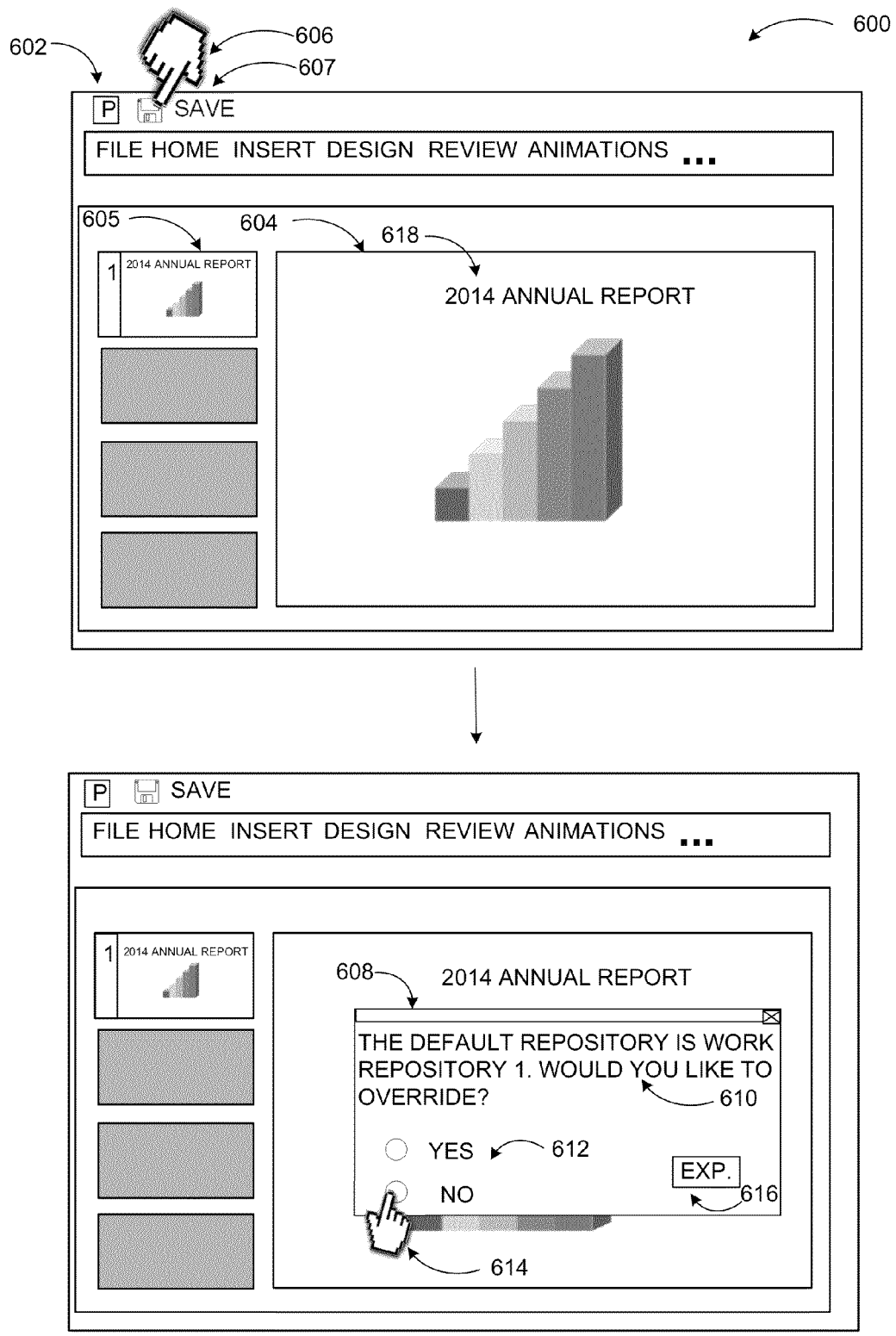
FIG. 6 illustrates an example scenario where a user may be presented with a default repository.

FIG. 6 illustrates an example scenario where a user may be presented with a default repository. As illustrated in diagram 600, a user may create content 604, such as an annual report document, through a presentation application 602. A user experience of the presentation application 602 may preview one or more slides 605 of the annual report document adjacent to a current slide of the annual report document being displayed. To save the content 604, the user may perform a direct save action 606 through one of touch input, as illustrated, gesture input, voice command, eye tracking, gyroscopic input, pen input, mouse input, and/or keyboard input. For example, the user may perform the direct save action 606 on a "Save" control element 607, which may be graphically and/or textually represented, on the user experience of the presentation application 602. Additionally or alternatively, the presentation application 602 may automatically save the content 604 through an implicit save action.

An inference application may be configured to employ context-based inference to automatically save the content 604 to a location within one or more containers of a repository. The inference application may be a third party service, for example, that includes a detection module and an inference engine. The detection module may be configured to detect the content 604 to be saved. The detection module may be configured to detect one or both of the direct save action 606 executed by the user and the implicit save action executed by the presentation application 602. The inference engine of the inference application may be configured to analyze one or more attributes of the user and the content 604 to infer a repository category to which the content 604 is related. Analyzing the attributes may include determining a context of the content 604. One or more elements of the determined context may include a type of the content, phrases 618 within the content, and one or more repositories selected for other similar content. In some examples, one or more of configurable rules, heuristics, machine learning, and a direct configuration by the user may be employed in the analysis to infer the repository category based on the determined context.

The content 604 may then be tagged with the inferred repository category. For example, the content 604 may be tagged as work-related content because the content includes a presentation document with statistically improbably phrases 618 that are common in other workplace content and communications, such as "2014 Annual Report." Furthermore, the content 604 may be similar to other content stored in a work repository in the past. For example, a presentation document including phrase "2013 Annual Report," may have been saved to a work-related repository last year.

The inference engine may be configured to determine a confidence level associated with the inferred repository category, work, based on a ratio of context elements that correspond to the inferred repository category, where one or more thresholds may be defined. The inference engine may determine that the confidence level is below a first threshold and above a second threshold. For example, there may be multiple work repositories (e.g., work repository 1, work repository 2, work repository 3), and the context elements while corresponding to a work repository category, may not provide further context to which specific work repository. The inference engine may present the user a default repository and provide the user an option to override the default repository through a user experience associated with the presentation application 602 or a user experience associated with the inference application. For example, a display element 608 may be presented on the user experience. The display element 608 may be a dialog box, for example, that includes a text-based prompt 610, such as, "The default repository is work repository 1. Would you like to override?" and presents options 612 of "yes" or "no". The user may perform a user action 614 to select no, and the content may be automatically saved to work repository 1. In other examples, the user may select yes to override the default repository and a list of repositories may be provided to the user for selection.

In some examples, one or more explanations 616 for the selection and presentation of the default repository may be provided to the user. For example, the explanation 616 may provide the determined confidence level and the associated context elements that caused the inference engine to infer the repository category of work repository 1.

Figure 7:
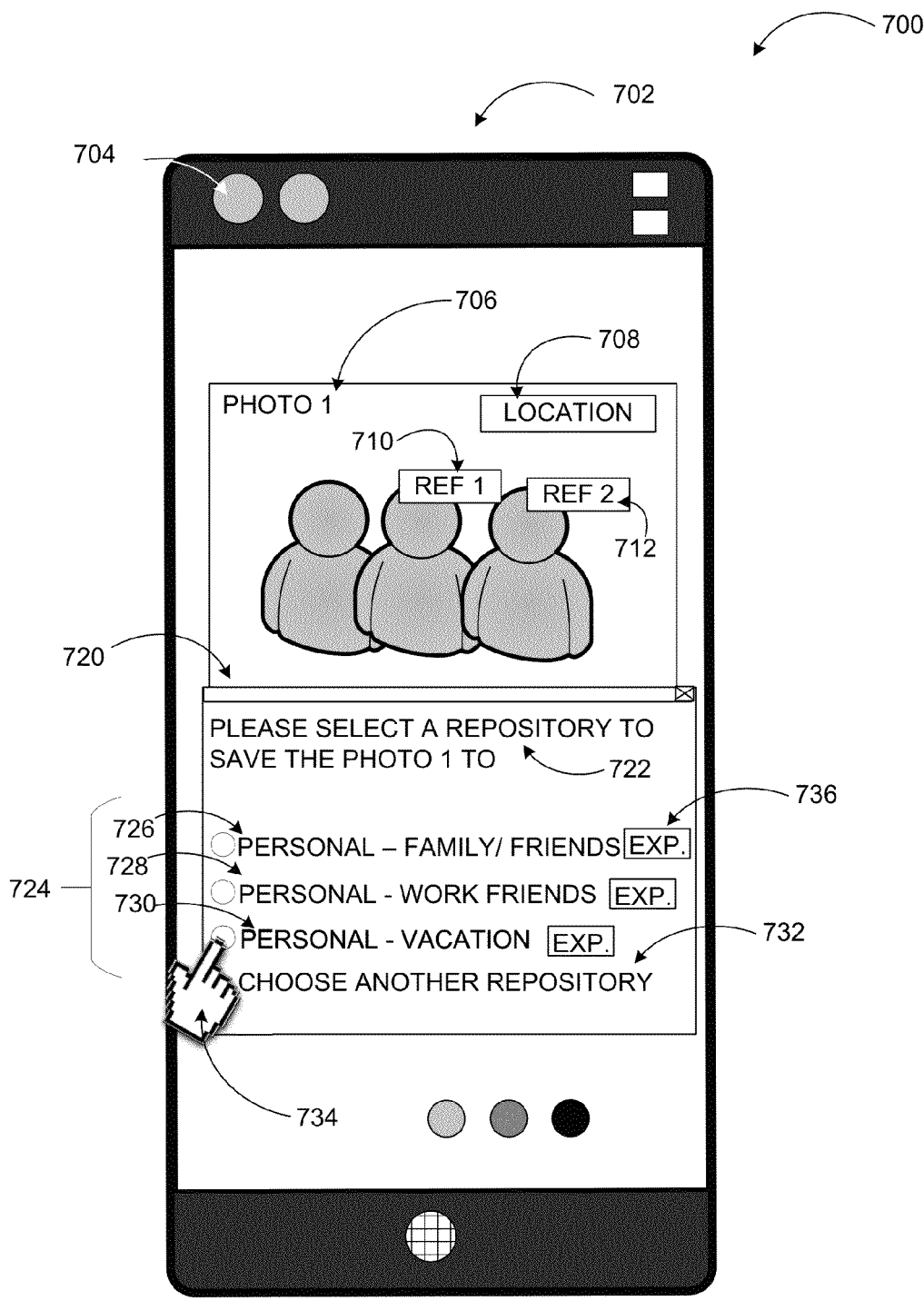
FIG. 7 illustrates an example scenario where a user may be presented with a list of repositories for user selection of a repository.

FIG. 7 illustrates an example scenario where a user may be presented with a list of repositories for user selection of a repository. As illustrated in diagram 700, a user may capture content 706, such as a photo, using a camera application 704 of a computing device 702, such as a smart phone. The camera application 704 may automatically save the content 706 through an implicit save action.

An inference application may be configured to employ context-based inference to automatically save the content 706 to a location within one or more containers of a repository. The inference application may be an integrated module of an operating system of the computing device 702, for example, that includes a detection module and an inference engine. The detection module may be configured to detect the implicit save action executed by the camera application 704 to detect the content 706 to be saved. The inference engine of the inference application may be configured to analyze one or more attributes of the user and the content 706 to infer a repository category to which the content 706 is related. Analyzing the attributes may include determining a context of the content 706. One or more elements of the determined context may include a type of the content, a source of the content, geotags 708, a reference to other users 710, 712 and one or more repositories selected for other similar content.

The content 706 may then be tagged with the inferred repository category. For example, the content 706 may be tagged as personal content because the content includes a photo that includes a geotag 708 indicative of a non-work-related location, and a reference at least one user who is not work-related 710. Furthermore, the content 706 may be similar to other content stored in a personal repository in the past. For example, a photo including references to the same users may have been saved to a personal repository.

The inference engine may be configured to determine a confidence level associated with the inferred repository category, personal, where one or more thresholds may be defined. The inference engine may determine that the confidence level is below a second threshold as the determined context elements may each correspond to different personal repository categories. For example, the referenced users may include both work-related users 712 and non-work related users 710, and past photos including references to the same users may have been saved in different personal categories, such as work friends and family/friends. Furthermore, a location of the geotag 708 may contextually infer a personal vacation category. The inference engine may present the user a list of repositories 724 through a user experience associated with the camera application 704 or a user experience associated with the inference application, where the list of repositories 724 may include an N number of repositories. For example, a display element 720 may be presented on the user experience. The display element 720 may be a dialog box, for example, that includes a text-based prompt 722, such as, "Please select a repository to save the photo to", and presents the list of repositories 724. The list of repositories 724 may include a "personal—family/friends" repository 726, a "personal—work friends" repository 728, and a "personal—vacation" repository 730, for example. An order of repositories presented in the list of repositories 724 may be prioritized based on the determined context elements and/or the determined confidence level associated with each of the repositories in the list. For example, the "personal—family/friends" repository 726 may be associated with a higher confidence level than the "personal—work friends" repository 728, and both may be associated with a higher confidence level than the "personal—vacation" repository 730. Thus, the "personal—family/friends" repository 726 may precede the "personal—work friends" repository 728, which may further precede the "personal—vacation" repository 730 in the presented list of repositories 724. The display element 720 may further include an option for the user to "choose another repository" 732 in case the user does not wish to select any of the repositories presented in the list of repositories 724. The user may perform a user action 734 to select the "personal—vacation" repository 730, and the content may be automatically saved to a personal vacation repository.

In some examples, one or more explanations 736 for the selection and presentation of each of the repositories within the list of repositories 724 may be provided to the user. For example, the explanations 736 may provide the determined confidence level for each repository and the associated context elements.

Figure 8:
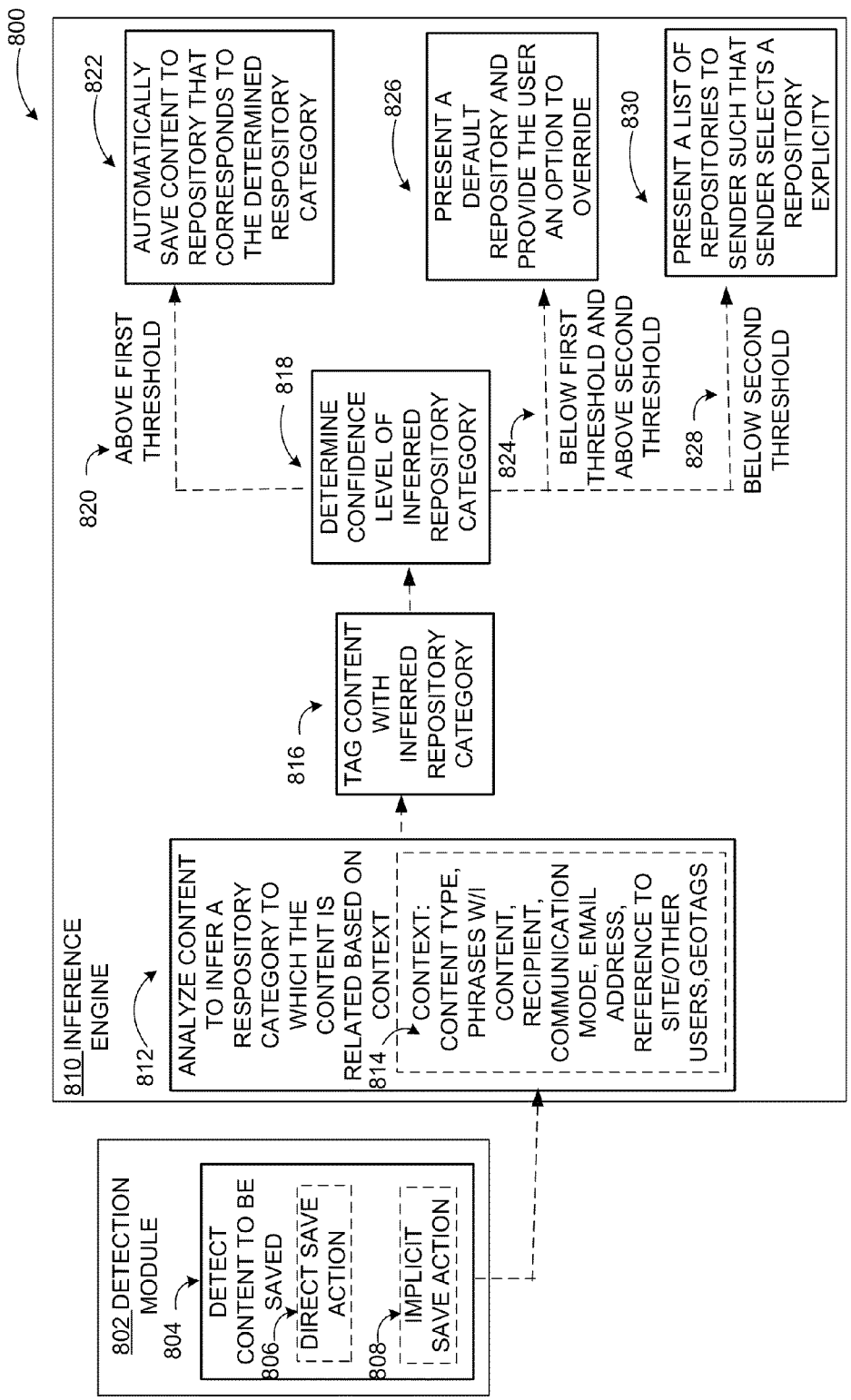
FIG. 8 illustrates an example process to automatically save content to a location.

FIG. 8 illustrates an example process to automatically save content to a location. As illustrated in diagram 800, an inference application may be configured to employ context-based inference to automatically save content to a location within one or more containers of a repository. The inference application may be a third party service, an integrated module of a coordinated application set, an integrated module of one or more applications provided by the coordinated application set or a web application, or an integrated module of an operating system. The inference application may include a detection module 802 and an inference engine 810.

The detection module 802 may be configured to detect content to be saved for a user 804. The detection module 802 may be configured to detect one or both of a direct save action 806 and an implicit save action 808. The inference engine 810 may be configured to analyze one or more attributes of the user and the content to infer a repository category to which the content is related 812. Analyzing the attributes may include determining a context of the content. One or more elements of the determined context 814 may include a type of the content, phrases within the content, a source of the content, a communication mode between a sender of the content and the user, an email address of one or both of the sender and the user, a reference to intranet sites, geotags, one or more repositories selected for other similar content, and a reference to other users. The content may then be tagged with the inferred repository category 816.

In some embodiments, the inference engine 810 may be further configured to determine a confidence level associated with the inferred repository category 818, where the confidence level may be a percentage of confidence that the inferred repository category is accurate based on a ratio of context elements that correspond to the inferred repository category. In some examples, there may be a first threshold and a second threshold of the confidence level. In response to a determination that the confidence level is above the first threshold 820, the content may be automatically saved to a repository of the data store that corresponds to the inferred repository category 822. In response to a determination that the confidence level is below the first threshold and above the second threshold 824, a default repository may be presented to the user along with an option to change the default repository 826. In response to a determination that the confidence level is below the second threshold 828, a list of repositories may be presented to the user for explicit selection of the repository 830.

The examples in FIGS. 1 through 8 have been described using specific network environments, systems, services, applications and processes to employ context-based inference to automatically save content to a location within one or more containers of a repository. Embodiments to employ context-based inference to automatically save content to a location within one or more containers of a repository are not limited to the specific network environments, systems, services, applications, and processes according to these examples.

Employment of context-based inference to automatically save content to a location within one or more containers of a repository, as described in the embodiments above, may eliminate additional user selection steps, advantageously reducing processor load and thus increasing a processing speed. Additionally, employment of context-based inference to automatically save content to a location within one or more containers of a repository may eliminate the inconvenience of user navigation and search for the appropriate container, improving usability and increasing user productivity. Furthermore, the determination of the confidence level associated with the inferred repository category may enhance reliability, along with enablement of the user to set permission levels for each container to ensure security of confidential content.

Figure 9:
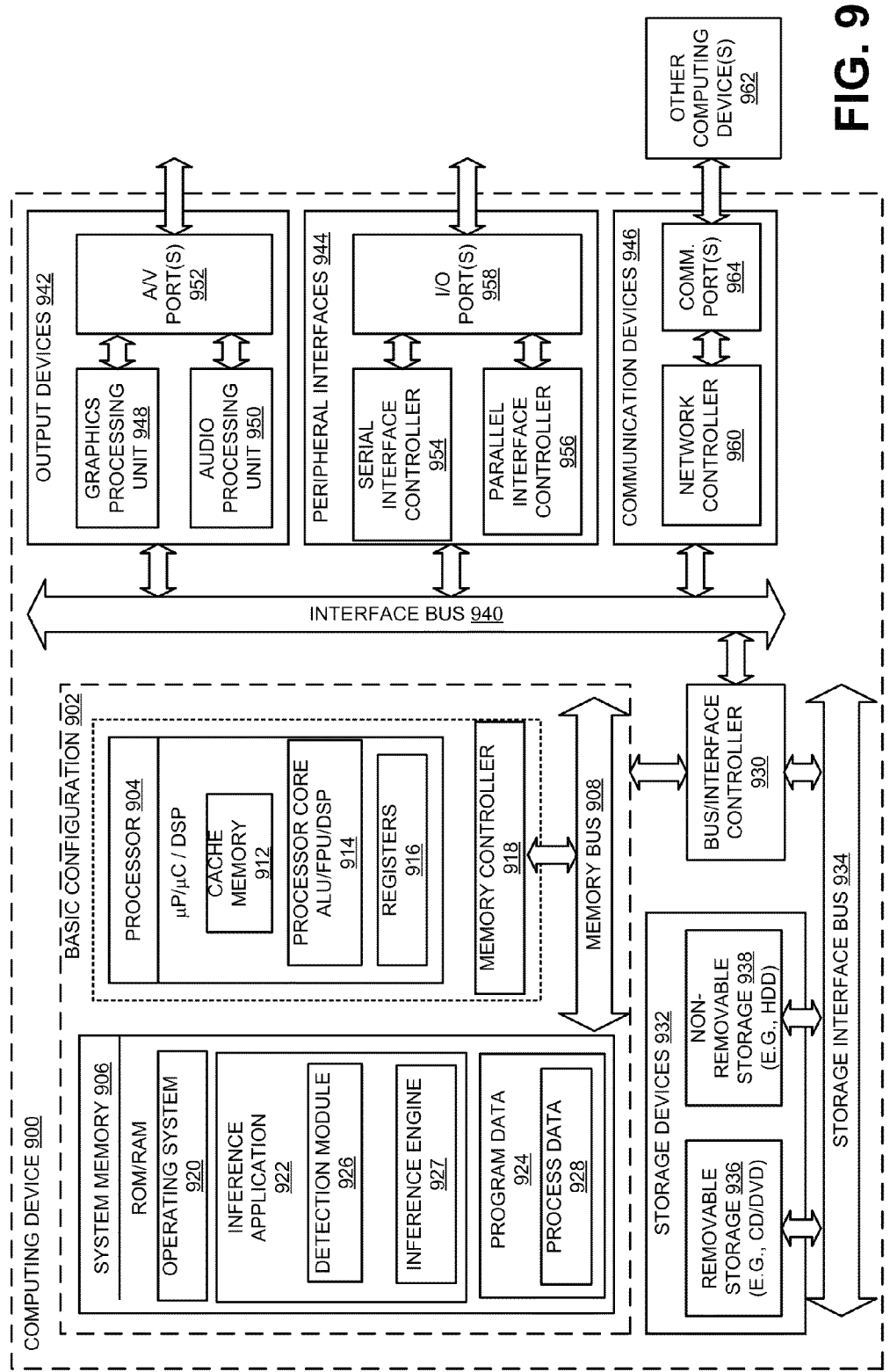
FIG. 9 is a block diagram of an example general purpose computing device, which may be used to automatically save content to a location.

FIG. 9 and the associated discussion are intended to provide a brief, general description of a general purpose computing device, which may be used to automatically save content to a location.

For example, computing device 900 may be used as a server, desktop computer, portable computer, smart phone, special purpose computer, or similar device. In an example basic configuration 902, the computing device 900 may include one or more processors 904 and a system memory 906. A memory bus 908 may be used for communicating between the processor 904 and the system memory 906. The basic configuration 902 is illustrated in FIG. 9 by those components within the inner dashed line.

Depending on the desired configuration, the processor 904 may be of any type, including but not limited to a microprocessor (μP), a microcontroller (μC), a digital signal processor (DSP), or any combination thereof. The processor 904 may include one more levels of caching, such as a level cache memory 912, one or more processor cores 914, and registers 916. The example processor cores 914 may (each) include an arithmetic logic unit (ALU), a floating point unit (FPU), a digital signal processing core (DSP Core), or any combination thereof. An example memory controller 918 may also be used with the processor 904, or in some implementations the memory controller 918 may be an internal part of the processor 904.

Depending on the desired configuration, the system memory 906 may be of any type including but not limited to volatile memory (such as RAM), non-volatile memory (such as ROM, flash memory, etc.) or any combination thereof. The system memory 906 may include an operating system 920, an inference application 922, and program data 924. The inference application 922 may include a detection module 926 and an inference engine 927, which may be integrated modules of the inference application 922 or separate applications. The detection module 926 may be configured to detect content to be saved for a user. The inference engine 927 may be configured to analyze one or more attributes of the user and the content to infer a repository category to which the content is related, determine a confidence level associated with the inferred repository category, and automatically save the content to a repository corresponding to the inferred repository category in response to a determination that the confidence level is above a first threshold. The program data 924 may include, among other data, process data 928 related to context of the content used to infer the repository category, as described herein.

The computing device 900 may have additional features or functionality, and additional interfaces to facilitate communications between the basic configuration 902 and any desired devices and interfaces. For example, a bus/interface controller 930 may be used to facilitate communications between the basic configuration 902 and one or more data storage devices 932 via a storage interface bus 934. The data storage devices 932 may be one or more removable storage devices 936, one or more non-removable storage devices 938, or a combination thereof. Examples of the removable storage and the non-removable storage devices include magnetic disk devices such as flexible disk drives and hard-disk drives (HDDs), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 906, the removable storage devices 936 and the non-removable storage devices 938 are examples of computer storage media. Computer storage media includes, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 900. Any such computer storage media may be part of the computing device 900.

The computing device 900 may also include an interface bus 940 for facilitating communication from various interface devices (for example, one or more output devices 942, one or more peripheral interfaces 944, and one or more communication devices 946) to the basic configuration 902 via the bus/interface controller 930. Some of the example output devices 942 include a graphics processing unit 948 and an audio processing unit 950, which may be configured to communicate to various external devices such as a display or speakers via one or more A/V ports 952. One or more example peripheral interfaces 944 may include a serial interface controller 954 or a parallel interface controller 956, which may be configured to communicate with external devices such as input devices (for example, keyboard, mouse, pen, voice input device, touch input device, etc.) or other peripheral devices (for example, printer, scanner, etc.) via one or more I/O ports 958. An example communication device 946 includes a network controller 960, which may be arranged to facilitate communications with one or more other computing devices 962 over a network communication link via one or more communication ports 964. The one or more other computing devices 962 may include servers, computing devices, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 900 may be implemented as a part of a general purpose or specialized server, mainframe, or similar computer that includes any of the above functions. The computing device 900 may also be implemented as a personal computer including both laptop computer and non-laptop computer configurations.

Example embodiments may also include methods to employ context-based inference to automatically save content to a location within one or more containers of a repository. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by pre-selected criteria that may be machine automated.

Figure 10:
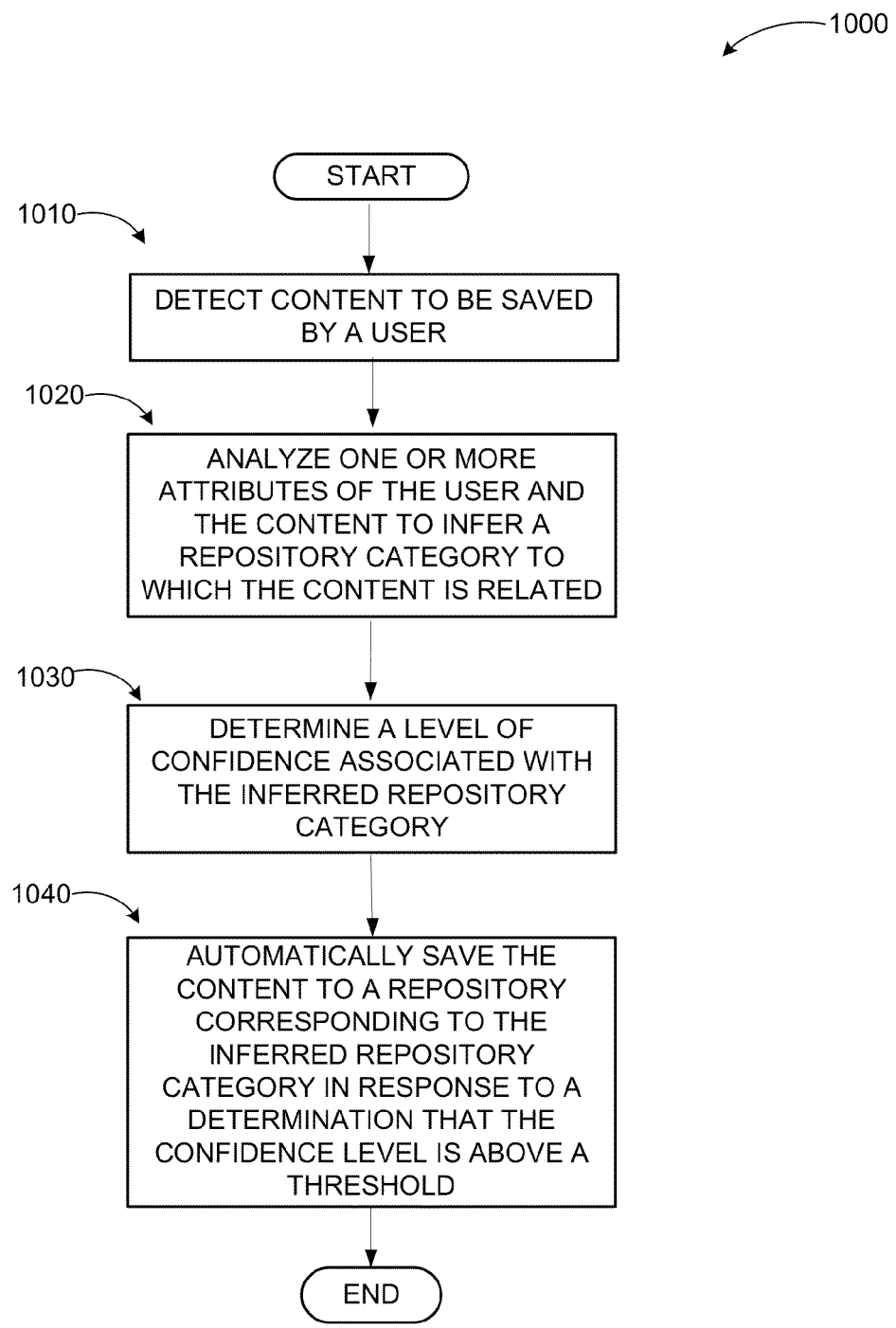
FIG. 10 illustrates a logic flow diagram of a method to automatically save content to a location, according to embodiments.

FIG. 10 illustrates a logic flow diagram for process 1000 of a method to automatically save content to a location, according to embodiments. Process 1000 may be implemented on a server or other system.

Process 1000 begins with operation 1010, where a detection module of an inference application may be configured to detect content to be saved for a user. The detection module may detect an implicit save action and/or a direct save action associated with the content, for example.

At operation 1020, an inference engine of the inference application may be configured to analyze one or more attributes associated with the user and the content to infer a repository category to which the content is related by determining a context of the content. The determined context of the content may include a type of the content, phrases within the content, a source of the content, a communication mode between a sender of the content and the user, an email address of one or both of the sender and the user, a reference to intranet sites, geotags, one or more repositories selected for other similar content, and/or a reference to other users. In some examples, one or more of configurable rules, heuristics, machine learning, and a direct configuration by the user may be employed in the analysis to infer the repository category based on the determined context.

At operation 1030, the inference engine may be configured to determine a level of confidence associated with the inferred repository category based on a ratio of determined context elements that correspond to the inferred repository category, where a first and second threshold may be defined.

At operation 1040, the inference engine may be configured to automatically save the content to a repository corresponding to the inferred repository category in response to a determination that the confidence level is above the first threshold. Alternatively, the inference engine may be configured to present one of a default repository with an option to override the default repository to a user through a user experience in response to a determination that the confidence level is below the first threshold and above a second threshold, and present a list of repositories to the user through the user experience for explicit selection of a repository to which the content is to be saved in response to a determination that the confidence level is below the second threshold.

The operations included in process 1000 are for illustration purposes. Employment of context-based inference to automatically save content to a location within one or more containers of a repository may be implemented by similar processes with fewer or additional steps, as well as in different order of operations using the principles described herein.

A means for employment of context-based inference to automatically save content to a location may include a means for detecting content to be saved for a user, a means for analyzing one or more attributes of the user and the content to infer a repository category to which the content is related, a means for determining a confidence level associated with the inferred repository category, and a means for automatically saving the content to a repository corresponding to the inferred repository category in response to a determination that the confidence level is above a first threshold.

According to some examples, computing devices configured to employ context-based inference to automatically save content to a location may be described. An example computing device may include a memory configured to store one or more instructions, and a processor coupled to the memory and configured to execute an inference application. The inference application may be configured to detect a direct save action or an implicit save action of a file, analyze one or more attributes of a user and the file to infer a repository category to which the content is related based on a context of the file, and determine a confidence level associated with the inferred repository category. The inference application may be further configured to automatically save the content to a repository corresponding to the inferred repository category in response to a determination that the confidence level is above a first threshold, or one of present a default repository to the user and provide the user an option to override the default repository through a user experience in response to a determination that the confidence level is below the first threshold and above a second threshold, and present a list of repositories to the user through the user experience for explicit selection of a repository to which the content is to be saved in response to a determination that the confidence level is below the second threshold.

In other examples, the user may be provided with one or more explanations through the user experience for the selection of the repository, the presentation of the default repository, or the presentation of the list of repositories. The user experience may be a user experience associated with an application through which the file is saved, or a separate user experience. The inference application may be a third party service. The inference application may be a service provided by an operating system of the computing device. The inference application may be an integrated module of the application.

According to some embodiments, methods to employ context-based inference to automatically save content to a location may be provided. An example method may include detecting content to be saved for a user, and analyzing one or more attributes of the user and the content to infer a repository category to which the content is related. The example method may also include determining a confidence level associated with the inferred repository category, and automatically saving the content to a repository corresponding to the inferred repository category in response to a determination that the confidence level is above a first threshold.

In other embodiments, a default repository may be presented to the user in response to a determination that the confidence level is below the first threshold and above a second threshold, where the user may be provided an option to override the default repository. A list of repositories may be presented to the user for explicit selection of a repository to which the content is to be saved in response to a determination that the confidence level is below the second threshold.

In further embodiments, analyzing the content to infer the repository category to which the content is related may include determining a context of the content, where the context of the content is a type of the content, phrases within the content, a source of the content, a communication mode between a sender of the content and the user, an email address of one or both of the sender and the user, a reference to intranet sites, geotags, one or more repositories selected for other similar content, and/or a reference to other users. The content may be tagged with the inferred repository category. A location to store the content within one or more containers of the repository may be determined. The content may be automatically saved to a secure container within the repository based on a determination that the content includes confidential material. The user may be enabled to set permission levels for content stored in one or more containers of the repository. According to some examples, systems configured to employ context-based inference to automatically save content to a location may be described. An example system may include a first server configured to provide access to an application to a user, and a second server configured to execute an inference application. The inference application may be configured to detect a direct save action of a file from a user or an implicit save action of the file through the application, and analyze one or more attributes of the user and the file to infer a repository category to which the file is related based on a context of the content. The inference application may be further configured to determine a confidence level associated with the inferred repository category, and automatically save the content to a repository corresponding to the inferred repository category in response to a determination that the confidence level is above a threshold. The example system may also include a data store comprising the repository, where the repository includes one or more containers for content storage.

According to some examples, systems configured to employ context-based inference to automatically save content to a location may be described. An example system may include a first server configured to provide access to an application to a user, and a second server configured to execute an inference application. The inference application may be configured to detect a direct save action of a file from a user or an implicit save action of the file through the application, and analyze one or more attributes of the user and the file to infer a repository category to which the file is related based on a context of the content. The inference application may be further configured to determine a confidence level associated with the inferred repository category, and automatically save the content to a repository corresponding to the inferred repository category in response to a determination that the confidence level is above a threshold. The example system may also include a data store comprising the repository, where the repository includes one or more containers for content storage.

In other examples, the repository category may include work repositories or personal repositories. The inference application and the application may be integrated modules of a coordinated application set. The data store may be part of a computing device associated with the user or a cloud data store.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A composing device configured to employ context-based inference to automatically save content to a location, the computing device comprising:
    a memory configured to store one or more instruction; and
    a processor coupled to the memory and configured to execute an inference application, wherein the inference application is configured to:
        detect a direct save action or an implicit save action of a file;
        analyze one or more attributes of a user and the file to infer a repository category to which the file is related based on a context of the file;
        determine a confidence level associated with the inferred repository category; and
        automatically save the file to a repository corresponding to the inferred repository category in response to a determination that the confidence level is above a first threshold; and
        provide an option to override a default repository through a user experience in response to a determination that the confidence level is below the first threshold and above a second threshold.

2. The computing device of claim 1, wherein the inference application is further configured to:
    present a list of repositories through the user experience for explicit selection of a repository to which the file is to be saved in response to a determination that the confidence level is below the second threshold.

3. The computing device of claim 1, wherein the user experience is a user experience associated with as application through which the file is saved.

4. The computing device of claim 2, wherein the list of repositories includes one of work repositories and personal repositories.

5. The computing device of claim 1, wherein the inference application is a service provided by an operating system of the computing device.

6. The computing device of claim 1, wherein the inference application is an integrated module of the application.

7. A method to employ context-based inference to automatically save content to a location, the method comprising:
    detecting content to be saved for a user;
    analyzing one or more attributes of the user and the content to infer a repository category to which the content is related;
    determining a confidence level associated with the inferred repository category;
    automatically saving the content to a repository corresponding to the inferred repository category in response to a determination that the confidence level is above a first threshold; and
    presenting a default repository in response to a determination that the confidence level is below the first threshold and above a second threshold.

8. The method of claim 7, further comprising:
    providing an option to override the default repository.

9. The method of claim 7, further comprising:
    presenting a list of repositories for explicit selection of a repository to which the content is to be saved in response to a determination that the confidence level is below the second threshold.

10. The method of claim 7, wherein analyzing the content to infer the repository category to which the content is related further comprises:
    determining a context of the content.

11. The method of claim 10, wherein the context of the content is one or more of: a type of the content, phrases within the content, a source of the content, a communication mode between a sender of the content and the user, an email address of one or both of the sender and the user, a reference to intranet sites, geotags, one or more repositories selected for other similar content, and a reference to other users.

12. The method of claim 10, further comprising:
    lagging the content with the inferred repository category.

13. The method of claim 7, farther comprising:
    determining a location to store the content within one or more containers of the repository.

14. The method of claim 7, further comprising:
    automatically saving the content to a secure container within the repository based on a determination that the content includes confidential material.

15. The method of claim 7, further comprising:
presenting through the user experience an option to set permission levels for content stored in one or more containers of the repository.

16. A system configured to employ context-based inference to automatically save content to a location, the system comprising:
a first server configured to provide access to an application;
a second server configured to execute a inference application, wherein the inference application is configured to:
detect one of a direct save action of a file or an implicit save action of the me through the application;
analyze one or me attributes of a user and the file to infer a repository category to which the file is related based on a context of the content;
determine a confidence level associated with the inferred repository category; and
automatically save the content to a repository corresponding to the inferred repository category in response to a determination that the confidence level is above a first threshold; and
present a default repository in response to a determination that the confidence level is below the first threshold and above a second threshold; and
a data store comprising the repository, wherein the repository includes one or more containers for content storage.

17. The system of claim 16, wherein the repository category includes one of work repositories and personal repositories.

18. The system of claim 16, wherein the inference application and the application are integrated modules of a coordinated application set.

19. The system of claim 16, wherein the data store is part of a computing device associated with the user or a cloud data store.

* * * * *